United States Patent [19]

Jones et al.

[11] 4,451,421

[45] May 29, 1984

[54] CONTINUOUS CASTING OF STRINGERS FOR SLIDING CLASP FASTENERS

[75] Inventors: Arthur L. Jones, Glenbrook; Ronald G. Seeney, Kingswood, both of Australia

[73] Assignee: Scovil, Inc., Waterbury, Conn.

[21] Appl. No.: 429,202

[22] Filed: Sep. 30, 1982

Related U.S. Application Data

[63] Continuation of Ser. No. 272,975, Jun. 12, 1981, abandoned, which is a continuation of Ser. No. 142,979, Apr. 23, 1980, abandoned, which is a continuation of Ser. No. 902,545, May 2, 1978, abandoned.

[30] Foreign Application Priority Data

May 4, 1977 [AU] Australia .............................. PC9975

[51] Int. Cl.³ ............................................ B29D 23/05
[52] U.S. Cl. .................................... 264/167; 264/251; 264/252
[58] Field of Search ....................... 264/251, 252, 167; 425/121, 116, DIG. 34, 814

[56] References Cited

U.S. PATENT DOCUMENTS 2,197,968  4/1940  Mattia ................................ 264/252
3,999,914  12/1976  Breher et al. ....................... 425/373

FOREIGN PATENT DOCUMENTS 307947  6/1955  Switzerland ....................... 264/252

Primary Examiner—James H. Derrington
Attorney, Agent, or Firm—Lackenbach, Siegel, Marzullo, Presta & Aronson

[57] ABSTRACT

The continuous casting of scoops upon tapes for a sliding clasp fastener which includes two casting rollers with peripheral cavities and an extrusion nozzle with juxtaposed tapes introduced between the nozzle and a first one of the rollers. The arrangement is such that molten plastics is introduced by the nozzle firstly into the cavities of the first roller ahead of the nip between the rollers and subsequently into the cavities of the second roller adjacent the nip. To ensure adequate solidification of the scoops before removal from the second roller the tapes are drawn off from said second roller at an angular position thereof beyond the nip.

4 Claims, 9 Drawing Figures

CONTINUOUS CASTING OF STRINGERS FOR SLIDING CLASP FASTENERS

This is a continuation, of application Ser. No. 272,975 filed June 12, 1981, now abandoned, which in turn is a cont. of Ser. No. 142,979 filed Apr. 23, 1980, now abandoned; which in turn is a cont. of Ser. No. 902,545 filed May 2, 1978, now abandoned.

This invention relates to casting of thermoplastic scoops upon one longitudinal edge of a tape to form a stringer for a sliding clasp fastener. More particularly the invention relates to achieving this result by a continuous casting facility and optionally for the simultaneous production of a pair of matable stringers.

Many years ago it was the practice to diecast in zinc on to a stringer tape the required interlocking elements (now frequently referred to simply as "scoops"). In more recent years the use of metals such as zinc has given way to the use of thermoplastic materials which have until now been applied by injection moulding to tapes which are frequently of textile material. According to this conventional process a finite length, sometimes about 25 cms, of the stringer is formed for each step of the process wherein the scoops are moulded on to the tape per shot of the injection moulding. When greater lengths of stringers are required the tape is traversed step-by-step through the dies with further shots being applied corresponding to the required length of stringer. Due to the repetitious nature of the process and the consequential slow cycling of the forming process, the cost of producing stringers for sliding clasp fasteners in this way has been a principal drawback to its marketing success.

It is the main object of this invention to provide for the casting of scoops upon stringer tapes as a continuous operation.

In accordance with the invention there is provided a method for continuous casting of a row of thermoplastic slide fastener interlocking elements upon a longitudinal edge of a stringer by the agency of an extrusion nozzle supplying thermoplastic material at the nip between a pair of rotatable casting rollers, said method comprising drawing said tape between said nozzle and a first one of said rollers and to said nip during extrusion of said thermoplastic material, and recovering said tape from said nip at such an angle with respect to the second one of said rollers that the interlocking elements cast on said tape are separated from said first roller before they are separated from said second roller and remain in contact with said second roller for part of its rotation.

According to another form of the invention there is provided apparatus for continuous casting of thermoplastic scoops upon confronting longitudinal edges of a pair of tapes to form a pair of matable stringers for a sliding clasp fastener, said apparatus comprising two juxtaposed rotatable casting rollers, a stationary nozzle for extruding molten thermoplastic material at the nip between said rollers, two parallel rows of cavities in one roller confronting two parallel rows of cavities in the other roller to form two confronting pairs of cavity rows for casting the shape of said scoops, means for passing a spaced pair of tapes between the nozzle and a first one of said rollers and between the rollers with confronting longitudinal edges of the tapes interlinked by respective ones of said confronting pairs of cavity rows, first means in said nozzle directing molten thermoplastic material into the cavities in said first roller at an angular position thereof in advance of said nip, second means conducting molten material into the cavities in the second of said rollers, and means for recovering said tapes from a far side of said nip of the rollers by withdrawing said tapes with cast scoops from said second roller at an angular position thereof removed from said nip.

The invention will be described in greater detail with reference to the accompanying drawings, in which:

FIG. 2A shows an enlarged view of detail "A" of FIG. 2;

FIG. 2B is a sectional view on line B—B of FIG. 2;

FIG. 3A is a sectional view as viewed on the line C—C of FIG. 3;

FIG. 5 is a similar sectional view to FIG. 2B showing a modification to the casting rollers of the apparatus.

Figure 1:
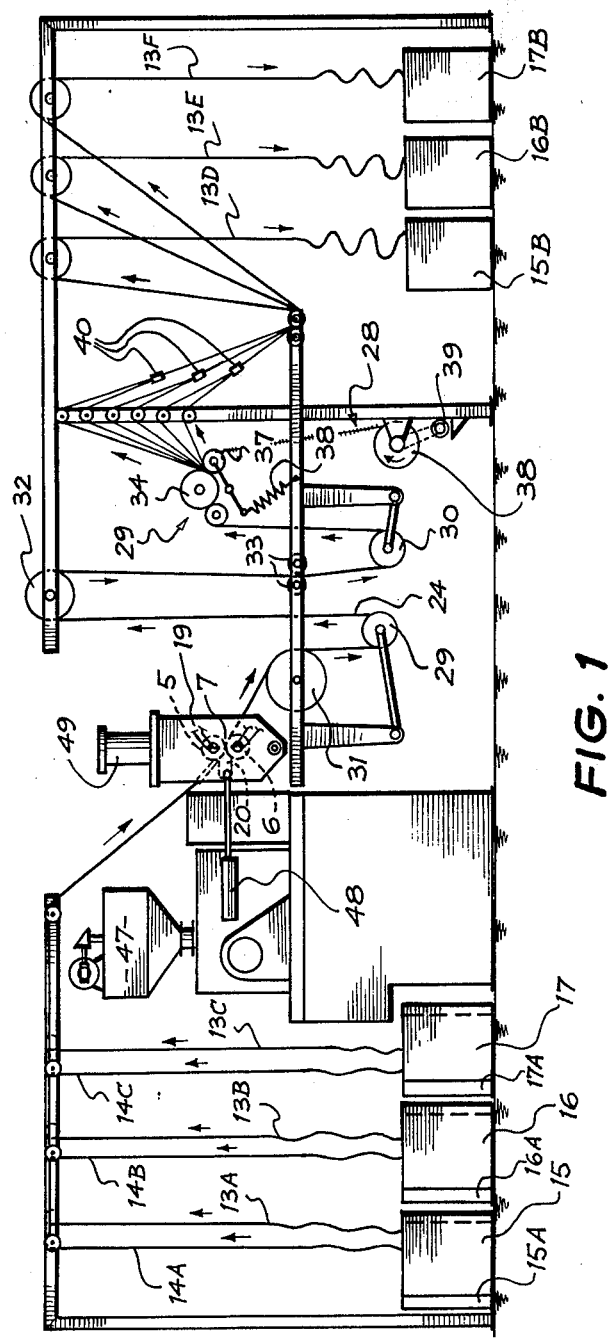
FIG. 1 shows in side elevation the apparatus used in the continuous casting process of this invention.
Figure 2:
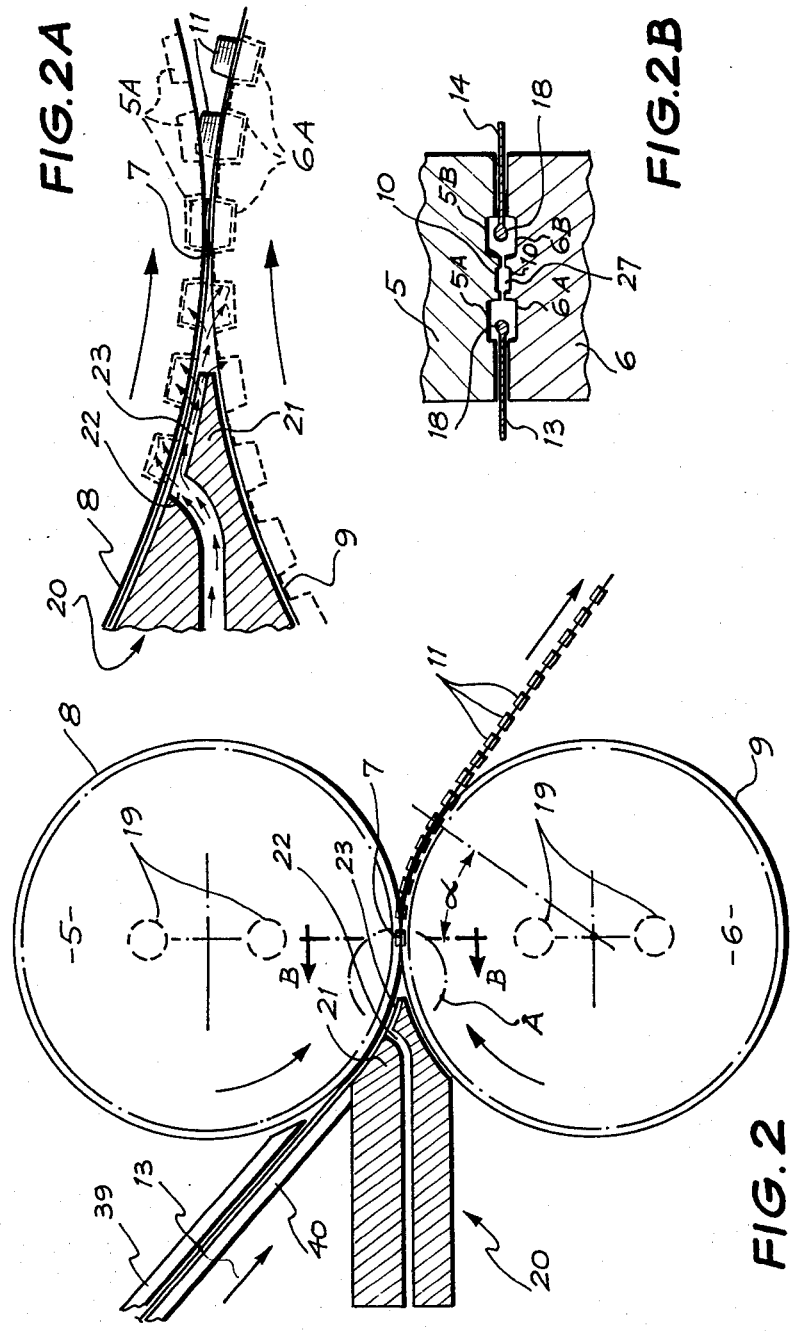
FIG. 2 is a part sectional side elevation to larger scale of the casting stage of said apparatus.

The invention will now be described with reference to the apparatus used from which the continuous casting process will be readily appreciated. The apparatus shown particularly in FIG. 1 consists of two juxtaposed, rotatable casting rollers 5 and 6, preferably geared together and suitably temperature controlled, at the nip 7 between which the continuous casting process of the invention is performed. The control of temperature is obtained by the passage of coolant through passages 19 (FIG. 2). The relative disposition of the rollers 5 and 6 will hereafter be assumed to be on horizontal axes in vertical alignment, but they may be otherwise disposed but always possessing parallel axes. Both rollers 5 and 6 around their peripheries 8 and 9 (see FIGS. 2 and 2A) are each provided with one pair, or more, of parallel rows of cavities 5A, 5B, and 6A, 6B, respectively, each row 5A or 5B of roller 5 confronting a corresponding cavity row 6A or 6B of the other roller 6 to form two confronting pairs of cavity rows. A protruding land 10 is provided in the periphery 8 and 9 of each roller 5 and 6 periphery between their respective two rows of cavities. All cavities 5A, 5B and 6A, 6B are of like form to cast therein, and between the confronting cavities of confronting pairs thereof, thermoplastic scoops 11 and 12 of predetermined configuration. The rollers 5 and 6 may incorporate any desired number of pairs of parallel rows of cavities 5A . . . 5N and 6A . . . 6N depending upon how many pairs of stringer tapes 13 and 14 are to be simultaneously provided with cast scoops 11 and 12. As shown in FIG. 1 three pairs of tapes 13A, 14A, 13B, 14B and 13C, 14C are supplied from bins 15, 15A and 16, 16A and 17, 17A and simultaneously processed to provide completed fastener chains 13D, 13E and 13F for delivery to bins 15B, 16B and 17B. As shown in FIG. 1 thermoplastic material in molten state is prepared in vat 47 and applied to an extrusion nozzle 20 by a ram 48. A hydraulic ram 49 maintains suitable pressure upon top roller 5.

A pair of coplanar tapes 13 and 14 are fed in spaced relationship to the nip 7 of the rollers 5 and 6 and passed between the rollers to respective lateral sides thereof. Each tape 13 and 14 is provided with one beaded lateral edge 18 and the two tapes 13 and 14 are held between the rollers 5 and 6 with their beaded edges 18 confronting and positioned medially within respective confronting pairs of cavity rows 5A, 5B and 6A, 6B.

Figure 3:
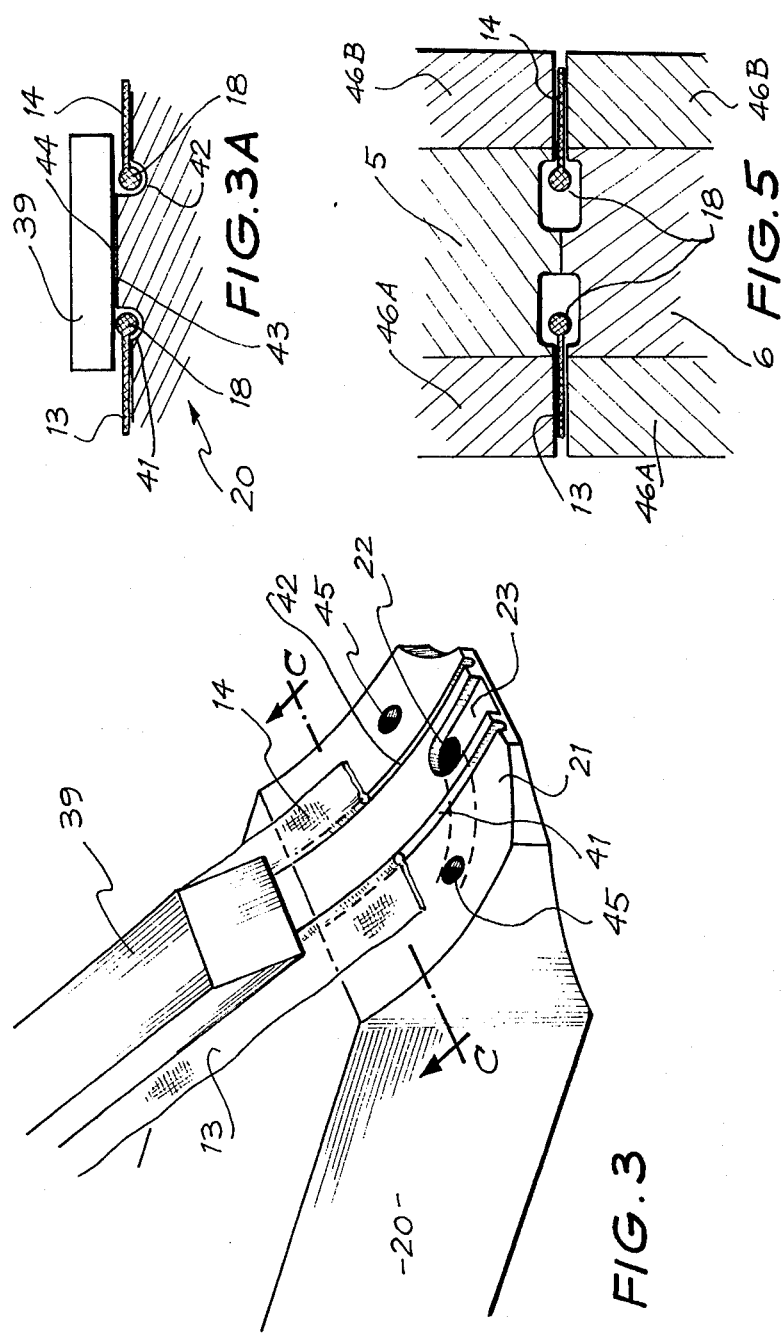
FIG. 3 is an enlarged view of the operative end of the extrusion nozzle used in the apparatus.

The heated, stationary extrusion nozzle 20 is positioned closely adjacent one side of the nip 7 between the rollers 5 and 6 with its operative end 21 concavely shaped to conform to the peripheries 8 and 9 of the rollers 5 and 6. The tapes 13 and 14 are fed to the nip 7 between the nozzle 20 and the upper roller 5 so that it is required for molten thermoplastic material to be forced around the confronting lateral edges 18 of the tapes 13 and 14 in order to fill completely the cavities 5A, 5B in the top roller 5. An orifice 22 in the nozzle 20 (FIGS. 2, 2A and 3) is positioned so as to direct the extruded material initially into the cavities 5A, 5B of the top roller 5. A bleed passage 23 beyond the orifice 22 permits excess extruded material to flow from the filled upper cavities 5A, 5B into the cavities 6A, 6B in the lower roller 6. FIGS. 3 and 3A show the extrusion nozzle separated from the rollers 5 and 6 and reveal the upper guide 39 of two spaced guides 39 and 40 which control the feed of the tapes 13 and 14 to the nip 7 of the rollers 5 and 6. Parallel grooves 41, 42 in the upper concave face of the end 21 of the nozzle 20 serve to locate the beaded lateral edges 18 of the tapes 13, 14. As can be seen in FIG. 3A the land 43 between the grooves 41, 42 is in an adjacent plane to the undersurface 44 of the guide 39. Holes 45 serve to accommodate heater elements (not shown) for maintaining a suitable temperature of the nozzle 20.

It will be appreciated that due to the introduction of extruded material into the cavities 5A, 5B of the upper roller 5 in advance of introduction into the lower cavities 6A, 6B, the portion of the scoops 11 and 12 on the upper surface of the tapes 13 and 14 will solidify firstly. Thus, insufficient time is allowed for hardening of the lower portion of the scoops 11 and 12 of the stringers 24 now formed are withdrawn from the nip 7 at the far side thereof in a horizontal plane, i.e. departing from both rollers 5 and 6 simultaneously. So as to provide additional time for solidifying of the portions of the scoops 11 and 12 cast in the cavities 6A, 6B of the lower roller 6 the stringers 24 are withdrawn from the lower roller 6 at a position angularly displaced from the nip 7. That is to say that the formed stringers 24 are recovered from the nip 7 at a rotated angle of between 30° and 45° of the bottom roller 6. This ensures against distortion in the casting of the lower portions of the scoops 11 and 12. Thus it will be a simple matter to determine the angular position in advance of the nip 7 that thermoplastic material is introduced to the cavities 5A, 5B of the top roller 5, and to arrange a corresponding angular disposition from the nip 7 where the stringers 24 are withdrawn from the lower roller 6, whereby adequate cooling of the thermoplastic material occurs before withdrawal of the scoops 11 and 12 from their respective casting moulds provided by the cavities 5A, 6A and 5B, 6B. This arrangement also permits relative high speed rotation of the rollers 5 and 6.

Figures 4, 4A:
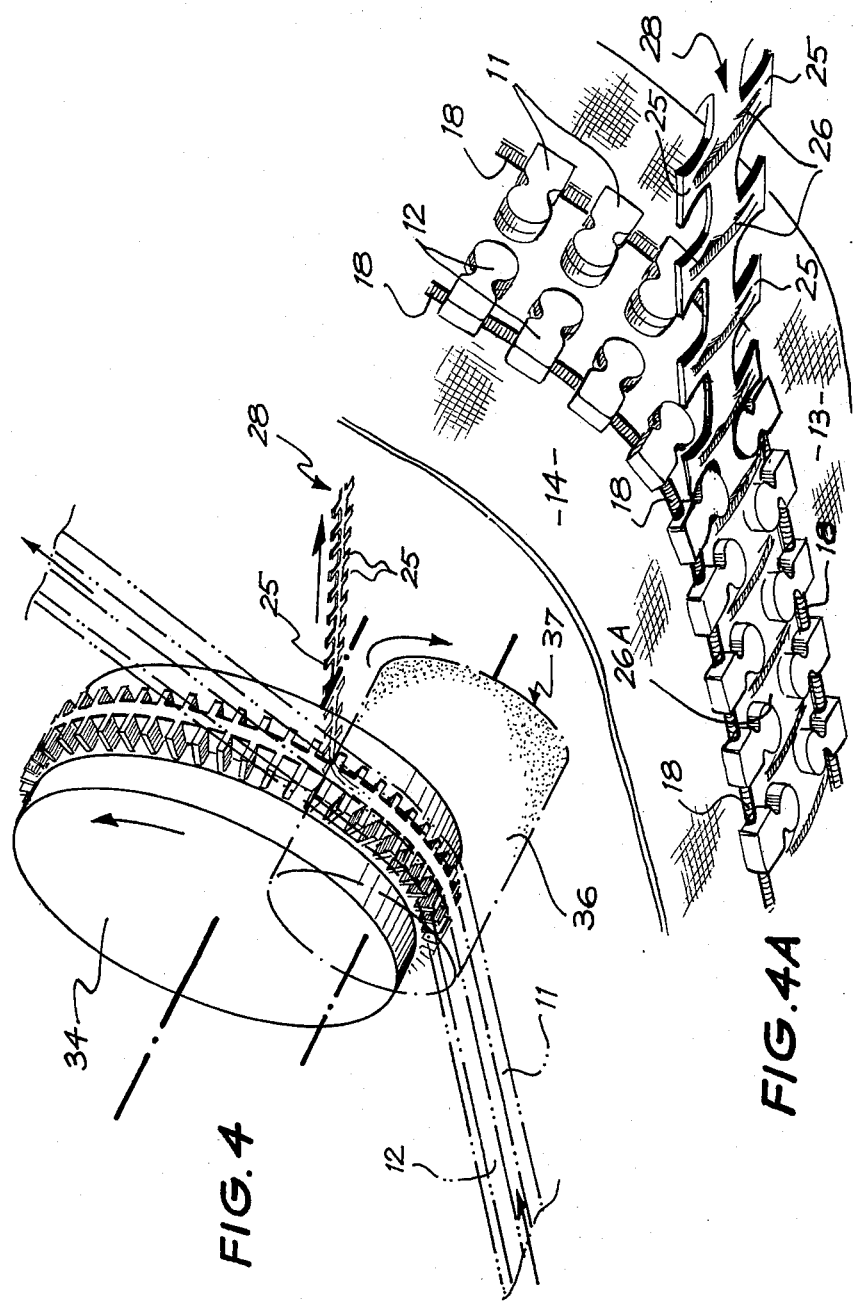
FIG. 4 is a perspective view of the stripping stage of said apparatus.
FIG. 4A shows a pair of tapes with cast elements at said stripping stage and to a much enlarged scale.

Due to difficulties in maintaining sufficient mechanical pressure between the two rollers 5 and 6 a flash of thermoplastic material between the scoops 11 and 12 on confronting edges 18 of the tapes 13 and 14 will occur. To enable this to be removed clearly and by a simple mechanical procedure the confronting lands 10 (FIG. 2B) between the rows of cavities 5A, 5B and 6A, 6B on the two rollers 5 and 6 are recessed at 27 but not adjacent the cavities 5A, 5B and 6A and 6B thus permitting a flash 25 which is no more than a thin film of thermoplastic material at those positions near the cavities. Reinforcing cross-bars 26 and longitudinal central thickening 26A will be provided by the recesses 27 in the lands 10 with the cross-bars 26 spaced along the length of the flash strip 28. This enables the flash strip 28 to be grasped by one end at the far side of the nip 7 and drawn from the completed stringers 24 after they have left the two rollers 5 and 6. Reference to FIG. 1 shows that removal of the flash strip 28 occurs at a stripper stage 29 after the stringers 13 and 14 have departed from the rollers 5 and 6 and been drawn over gravity tension rolls 29 and 30 and guide rolls 31, 32 and 33. As shown in more detail in FIG. 4 a stripper wheel 34 provided with a peripheral array of transverse blades 35 is held resiliently by a spring 38 against the periphery 36 of a roller 37 having a polyurethane sleeve. A pair of stringers 13, 14 is drawn through the nip between the wheel 34 and the roller 37 so that the cross-bars 26 are depressed by respective ones of the blades 35 out of the plane of the scoops 11, 12. Due to the thinness of the thermoplastic material adjacent the scoops 11, 12 the entire flash strip 28 is severed neatly and simply more by a tearing action than by cutting. The recovered flash strip 28 is passed over the roller 37 to a take-up roller 38 frictionally rotated by a motor 39. The pairs of stringers 13, 14 are subsequently conveyed through closers 40 to unite each pair of stringers 13, 14 into a respective slide fastener chain 13D, 13E or 13F.

It has been found that sometimes the casting rollers 5 and 6 pinch the tapes 13 and 14 and tend to stretch the beaded edge 18 so that if insufficient curve is provided in the weaving of the tapes 13 and 14 an uneven fastener results. To overcome this the two casting rollers 5 and 6 may be of narrow form, as shown in FIG. 5, so as to grip only a marginal edge portion adjacent the beaded edge 18 thereof and separate pairs of tape feeding rollers 46A and 46B provided to opposite sides of the casting rollers 5 and 6 which grip between each pair 46A and 46B the remainder of respective tapes 13 and 14. These latter rollers 46A and 46B may be driven independently from the casting rollers (say 1% faster) thereby to feed in sufficient tape 13 or 14 to compensate for the stretch referred to above. The actual amount of overdrive will depend on whether a flat fastener or one with a wavy tape edge is desired.

Whereas a preferred embodiment has been described above it should be understood that other forms, modifications and refinements are feasible within the scope of this invention. It is preferred that the thermoplastic material utilized be nylon but any other suitable material may alternatively be employed.

What is claimed is:

1. In an improved method of continuous casting a row of thermoplastic slide fastener interlocking elements upon a longitudinal edge of a stringer tape of indefinite length by an extrusion nozzle having an orifice and supplying thermoplastic material in advance of a nip between a pair of rotatable casting rollers, each having peripheral cavities for the casting of said interlocking elements, said improved method comprising the steps of:

driving said pair of casting rollers at a relatively high speed while at the same time insuring adequate solidification of said interlocking elements before removal therefrom by drawing said stringer tape between said nozzle and a first one of said rollers and to a first side of said nip during extrusion of said thermoplastic material, from said orifice initially into the cavities of said first roller in advance of said nip for initially solidifying the portions of said interlocking elements on the upper surface of said stringer tape and subsequently into the cavities of the second one of said rollers, and delaying the removal of said stringer tape by recovering said stringer from the other side of said nip at such an angle with respect to said second roller of from about 30° to about 45°, such that said interlocking elements cast on said stringer tape are separated from the cavities of said first roller before they are separated from the cavities of said second roller and said interlocking elements further remaining in the cavities and in contact with said second roller for the 30°–45° angular segment portion of its rotation, thereby providing sufficient time for hardening of the portions of the interlocking elements on the lower surface of said stringer tape.

2. The method of claim 1, wherein said orifice faces said first roller at an angular position thereof in advance of said nip, and said thermoplastic material applied to said second roller is overflow thermoplastic material from said first roller and conveyed to said nip by a passage connected with said orifice.

3. The method of claim 1, wherein a pair of said tapes coplanar and in juxtaposition are drawn simultaneously to said nip and individual rows of said interlocking elements in spaced disposition are cast simultaneously together with an interconnecting flash upon confronting longitudinal edges of said pair of tapes.

4. The method of claim 3, wherein by the configuration of said cavities in said rollers said flash is a continuous strip during casting and has a weakened marginal edge portion adjacent said interlocking elements, whereby pressure applied between said elements and said flash strip separates said flash strip cleanly from said interlocking elements.

* * * * *

UNITED STATES PATENT AND TRADEMARK OFFICE
CERTIFICATE OF CORRECTION

PATENT NO. : 4,451,421

DATED : May 29, 1984

INVENTOR(S) : Arthur L. Jones and Ronald G. Seeney

It is certified that error appears in the above—identified patent and that said Letters Patent is hereby corrected as shown below:

Title page:

[73] Column 1, line 6, please change "Scovil" to -- Scovill -- .

Signed and Sealed this

Eleventh Day of June 1985

[SEAL]

Attest:

DONALD J. QUIGG

Attesting Officer    Acting Commissioner of Patents and Trademarks